US012104072B2

(12) United States Patent
Jensen et al.

(10) Patent No.: US 12,104,072 B2
(45) Date of Patent: Oct. 1, 2024

(54) PAINT WITH LOW LIGHT REFLECTIVITY

(71) Applicant: SURREY NANOSYSTEMS LIMITED, Newhaven (GB)

(72) Inventors: Ben Poul Jensen, Newhaven (GB); Fiona-Mairéad McKenna, Newhaven (GB); William John Kristian Ludlam, Newhaven (GB)

(73) Assignee: SURREY NANOSYSTEMS LIMITED, Newhaven (GB)

( * ) Notice: Subject to any disclaimer, the term of this patent is extended or adjusted under 35 U.S.C. 154(b) by 703 days.

(21) Appl. No.: 16/646,521

(22) PCT Filed: Oct. 8, 2018

(86) PCT No.: PCT/GB2018/052870
§ 371 (c)(1),
(2) Date: Mar. 11, 2020

(87) PCT Pub. No.: WO2019/073210
PCT Pub. Date: Apr. 18, 2019

(65) Prior Publication Data
US 2020/0270475 A1    Aug. 27, 2020

(30) Foreign Application Priority Data
Oct. 9, 2017    (GB) .................................... 1716503

(51) Int. Cl.
*C09D 131/04*    (2006.01)
*B05D 1/02*    (2006.01)
(Continued)

(52) U.S. Cl.
CPC ............. *C09D 131/04* (2013.01); *B05D 1/02* (2013.01); *B05D 3/0486* (2013.01); *B05D 3/148* (2013.01);
(Continued)

(58) Field of Classification Search
CPC .......... C09D 131/04; C09D 7/61; C09D 7/20; F24S 70/20; B05D 1/02; B05D 3/0486;
(Continued)

(56) References Cited

U.S. PATENT DOCUMENTS 6,585,173 B2    7/2003  Schmon et al.
2009/0239083 A1  9/2009  Kojima et al.
(Continued)

FOREIGN PATENT DOCUMENTS

CN    101632981 A    1/2010
CN    104861868 B    3/2017
(Continued)

OTHER PUBLICATIONS

Brinker et al. "Sol-gel strategies for controlled porosity inorganic materials" J. Membrane Sci. 94 (1994) 85-102.*
(Continued)

*Primary Examiner* — Robert S Walters, Jr.
(74) *Attorney, Agent, or Firm* — James S. Keddie; Bozicevic, Field & Francis LLP

(57) ABSTRACT

A method of coating a substrate includes the steps of: (i) providing a suspension of dye and a binder in a solvent, wherein the ratio of dye to binder is greater than 40 wt % and the dye is uniformly dispersed in the solvent; (ii) spray-coating the suspension onto the substrate with the majority of the solvent evaporating during the spray coating step to result in a coating of dye and binder on the substrate having a density of up to 0.75 gcm-3; and (iii) continuing step (ii) until the coating thickness is at least 30 micrometres; wherein the dye does not include any carbon nanotubes.

24 Claims, 9 Drawing Sheets

Figure 1: VBX spray paint as-sprayed (left) etched (right)

(51) Int. Cl.
- *B05D 3/04* (2006.01)
- *B05D 3/14* (2006.01)
- *B05D 5/06* (2006.01)
- *C08K 3/04* (2006.01)
- *C09D 7/20* (2018.01)
- *C09D 7/61* (2018.01)
- *F24S 70/20* (2018.01)
- *G02B 1/111* (2015.01)

(52) U.S. Cl.
CPC .......... *B05D 5/06* (2013.01); *C08K 3/04* (2013.01); *C09D 7/20* (2018.01); *C09D 7/61* (2018.01); *F24S 70/20* (2018.05); *G02B 1/111* (2013.01)

(58) Field of Classification Search
CPC . B05D 3/148; B05D 5/06; C08K 3/04; G02B 1/111
See application file for complete search history.

(56) References Cited

U.S. PATENT DOCUMENTS

| | | |
|---|---|---|
| 2011/0135941 A1 | 6/2011 | Otani et al. |
| 2014/0087088 A1 | 3/2014 | Schmitt et al. |

FOREIGN PATENT DOCUMENTS

| | | | |
|---|---|---|---|
| EP | 1222964 A1 | 7/2002 | |
| JP | 2005205362 A | 8/2005 | |
| KR | 20090100295 A | 9/2009 | |
| KR | 20140003742 A | 1/2014 | |
| WO | WO 2010/018852 A1 | 2/2010 | |
| WO | WO 2013/158049 A1 | 10/2013 | |
| WO | WO 2017/001405 A1 | 1/2017 | |
| WO | WO 2017/033027 A1 | 3/2017 | |
| WO | WO-2017033031 A1 * | 3/2017 | ............... B05D 1/00 |

OTHER PUBLICATIONS

Chockalingam "Abrasion Resistant Anti-Reflective Sol-Gel Coatings" 2009, published online as of 2013.* aerogel.org "Production of Silica Gels: Alkoxide Method" available online as early as Oct. 2014 accessed at http://www.aerogel.org/?p=90.*

Jang et al. "Phase-Separation Prevention and Performance Improvement of Poly(vinyl acetate)/TEOS Hybrid Using Modified Sol-Gel Process" Journal of Applied Polymer Science, vol. 82, 2310-2318 (2001).*

* cited by examiner

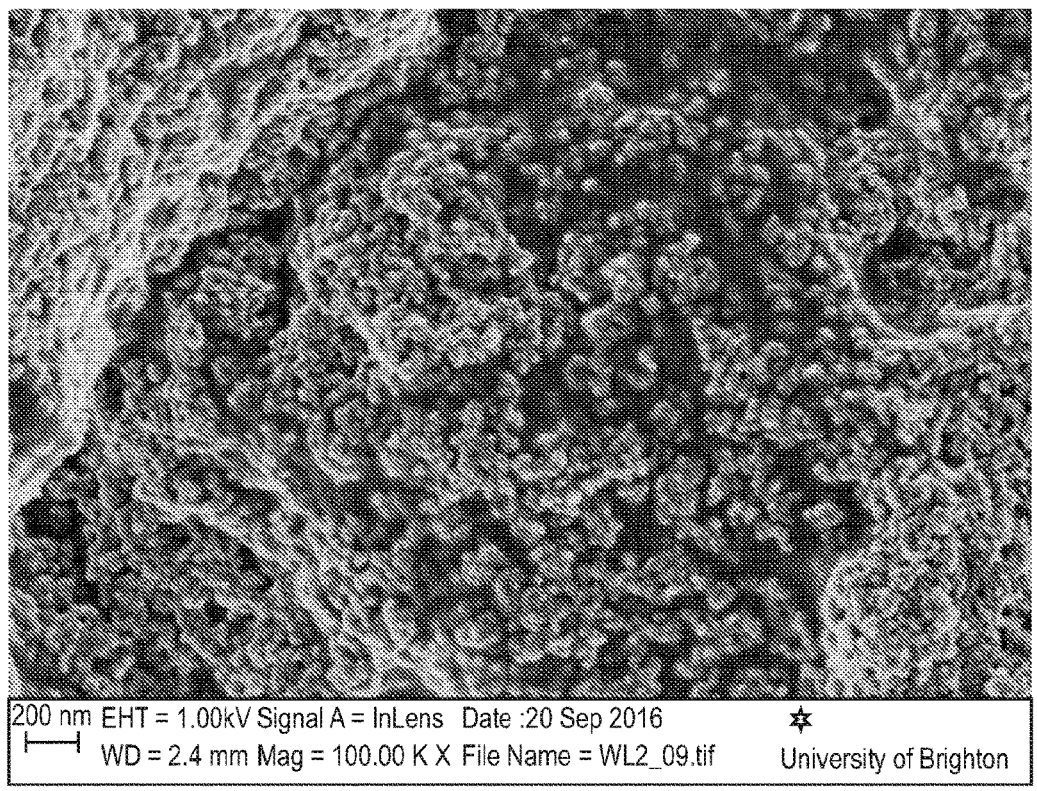
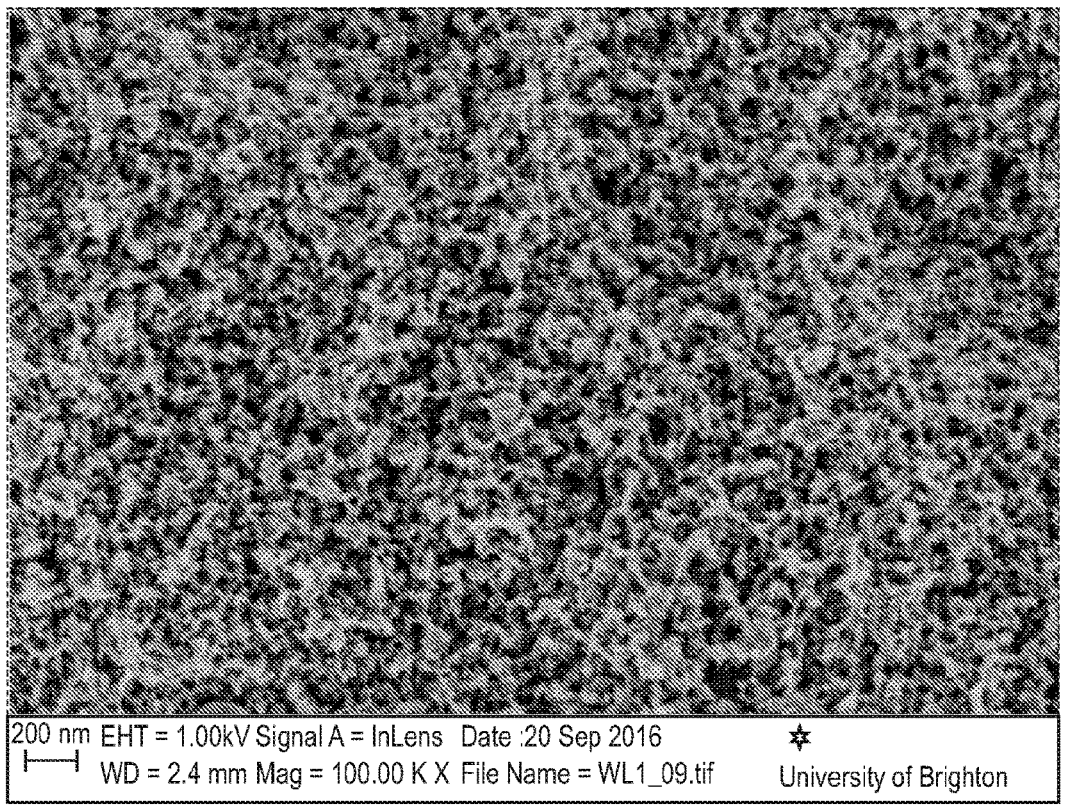
Figure 1: VBX spray paint as-sprayed (left) etched (right)
Fig. 1

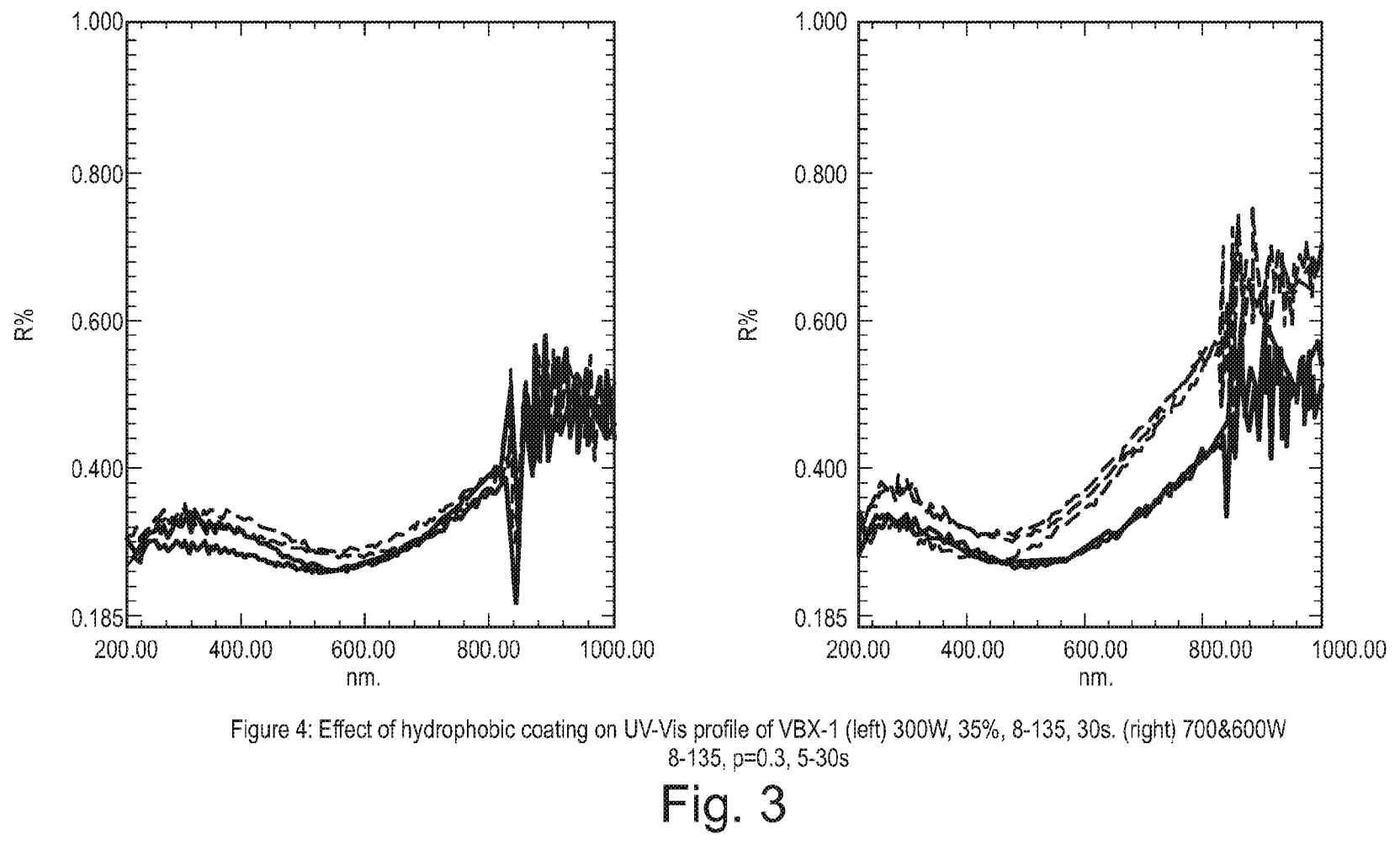

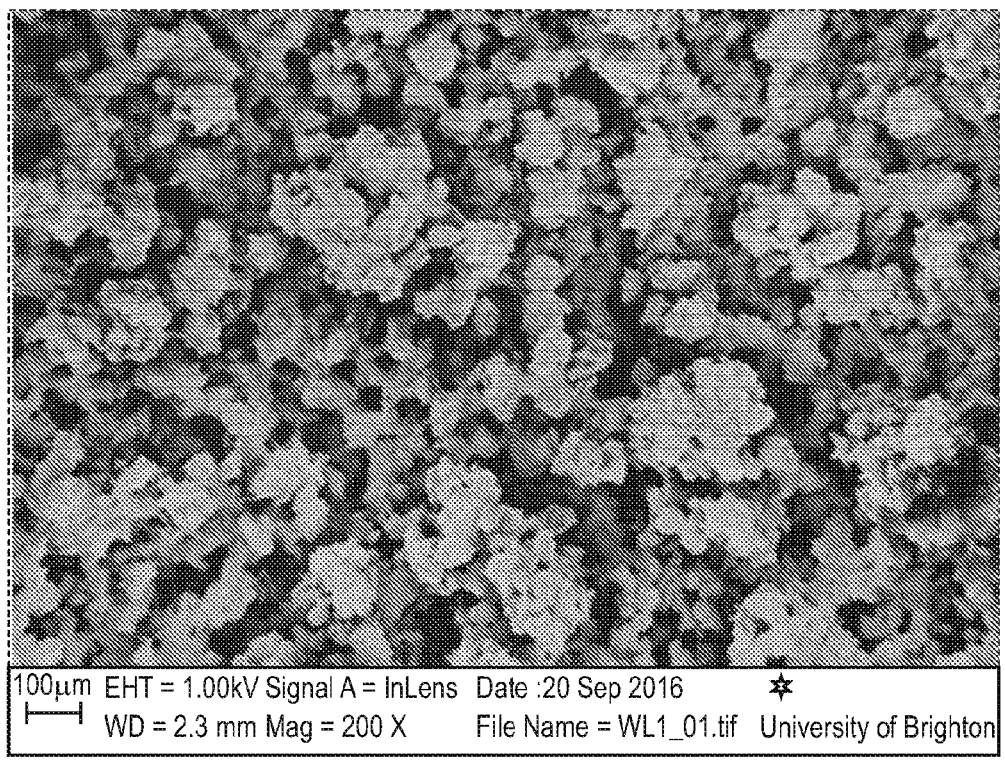
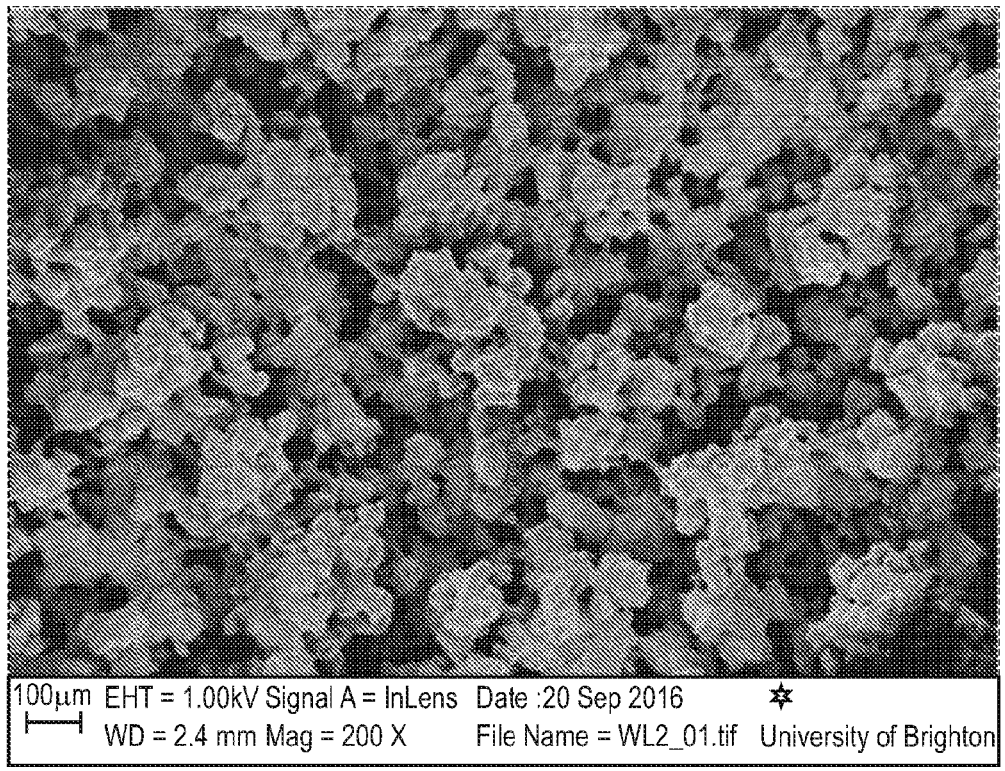
Fig. 4

Figure 5: Density vs. THR for worked example 16 with other samples sprayed resulting in different densities.

PAINT WITH LOW LIGHT REFLECTIVITY

CROSS-REFERENCE TO RELATED APPLICATIONS

This application is a § 371 national phase of International Application No. PCT/GB2018/052870, filed on Oct. 8, 2018, which claims the benefit of United Kingdom Application No. 1716503.6, filed on Oct. 9, 2017, which applications are incorporated by reference herein.

TECHNICAL FIELD

The present application relates to method of coating a substrate, and in particular a method of coating a substrate with a paint with a low light reflectivity. It also relates to the coating itself.

BACKGROUND OF THE INVENTION

For a very long time there have been efforts to produce environmentally stable coatings and devices having very low reflectivity for a variety of industrial and scientific applications. These are important in imaging systems, calibration targets, instrumentation, light guides, baffles, stray light suppression and in many other uses.

To be commercially useful, these coatings must have the lowest reflectance possible and be capable of substantially uniform optical absorption over a wide area. Equally importantly, they should preferably exhibit a flat spectral response, low outgassing when exposed to vacuum, high resistance to mechanical shock and vibration with low particulate fallout, good thermal shock resistance and resistance to moisture. These are key requirements for many industrial and scientific applications as the coatings are often local to high sensitivity electronic detectors such as CCD (charged coupled device) or microbolometers. Any contamination from such coatings will inevitably collect or condense on the detectors rendering them faulty or lowering their performance beyond an acceptable threshold.

One way of creating a surface with a low light reflectivity is to employ carbon nanotubes in the form of a coating. The present applicant has developed very low reflectivity coatings and coating methods and these are disclosed in its PCT publication numbers WO2017/033031 and WO2017/033027, the contents of which are incorporated herein by reference.

Absorber coatings formed of carbon nanotubes can be a very effective way of reducing reflectivity. However, they are relatively expensive to prepare and the resulting surfaces are easily damaged by physical contact. Also, because of the physical nature of carbon nanotubes (they are a strong irritant to eyes and mucus membranes when in a powdered state), the coatings should not be used in areas open to human exposure where direct contact or abrasion might occur. They are also costly to prepare due to the many additional safety systems required to separate workers from the production environment.

The present application seeks to provide an improved method of coating a substrate with a low reflectivity coating that does not contain carbon nanotubes whilst providing a comparable optical absorption.

EP 2 466 341 A1 (Fujifilm Corporation) discloses a method of coating a black resist layer on the surface of a substrate or lens module in order to prevent ghosts, flares and the like due to reflected light. The resist composition may include a black pigment (such as carbon black), a solvent and a dispersion liquid. Because the disclosed method involves exposing a pattern using photolithography, the resist composition may include a photosensitive component, a photopolymerization initiator and a sensitizer. The resist layer may be spray-coated onto the substrate and the result is a photocurable solid film. Total hemispherical reflectance values for the resulting resist layer are not quoted. Instead, the quoted reflectance levels are measured at 5 degrees from normal and referenced to a metallic film and so represent directional reflectance levels only (reflectance in a single direction) which will be much lower than the total hemispherical reflectance (THR), which is a measure of reflectance of a material where the incident light hits at an angle of 8 degrees from normal and the reflection from all angles is collected by a diffuse integrating sphere.

Other inferior coatings are disclosed in U.S. Pat. No. 5,490,893; WO 2011/133000; EP 3 159 741; WO 2008/133887; U.S. Pat Nos. 5,725,807 AND 4,197,221.

WO 94/17147 A1 (PPG) discloses a coating mixture for interior walls, which is applicable by spraying, which contains substantially finely divided cellulose fiber as a filler, cellulose or starch based binder, water and foaming agent, whereby the mixture can contain also small amounts of additives or adjuvants, and the amount of binder calculated from the cellulose fiber is 3 to 15% by weight, and the dry matter content of the mixture is higher than approximately 12% by weight. The invention also relates to a method for the preparation and application of the coating mixture.

CN 105860719 A (Qingdao Air) discloses a sprayable baking type water soluble damping coating and a preparation method thereof. The sprayable baking type water soluble damping coating is prepared from, by weight, 10-50 parts of acrylic emulsion, 5-20 parts of emulgator, 0.1-10 parts of neutralizer, 1-20 parts of a dispersing agent, 1-15 parts of cosolvent, 10-80 parts of pigment filler and 1-50 parts of water.

The present application seeks to provide an improved method of coating a substrate with a low reflectivity coating.

In accordance with a first aspect of the present invention, there is provided a method of coating a substrate, including the steps of:
  (i) providing a suspension of dye and a binder in a solvent, wherein the ratio of dye to binder is greater than 40 wt % (preferably greater than 60 wt %, more preferably greater than 80 wt %) and the dye is uniformly dispersed in the solvent;
  (ii) spray-coating the suspension onto the substrate with the majority of the solvent evaporating during the spray coating step to result in a coating of dye and binder on the substrate having a density of up to 0.75 gcm$^{-3}$ (and preferably from 0.35 to 0.75 gcm$^{-3}$); and
  (iii) continuing step (ii) until the coating thickness is at least 30 micrometres;
  wherein the dye does not include any carbon nanotubes.

The surprising realization of the present invention is that (under the right process conditions) a coating having a very low total hemispherical reflectance (THR)—for instance of the order of 1% or less in the visible spectrum—can be prepared using an ordinary dye (such as carbon black based pigment).

Total hemispherical reflectance measurements are the most complete measurement of a materials interaction with light, and is the accepted standard for measuring the performance of very low reflectivity materials. An integrating sphere, internally coated with a highly reflective surface (barium sulphate (BaSO4)) is used to a collect light reflected off a sample from all angles. The amount of light reflected from a sample is compared to that reflected by a diffuse BaSO4 reference in the form of a percentage. The incident light is focused at 8 degrees off normal so that specular as well as diffuse contributions from the surface are collected. Typical state of the art black pigment loaded absorber coatings have THRs in the range of 3-5%, so are not able to improve the performance of optical systems beyond what has already been achieved.

Without wishing to be constrained by theory, it is thought that the key to preparing a coating with a low THR is to keep the density of the resulting coating under the figure in question. One theory developed by the present applicant is that low density coatings have a greater number of pores which when combined with a suitable dye can act as optical 'traps' to suppress light reflectance. The photons enter and can undergo multiple internal reflections within the cavities until they are absorbed. In a conventional paint coating this action is not possible. To provide efficient absorption from all angles)(0-90°), the low density structure needs to have a surface texture that scatters the light away that fails to enter into the coating structure. This surface roughness or structure should be created whilst applying the coating. A measurement of the absorber coatings ability to absorb and scatter light is called TIS, or total integrated scatter. A surface that is strongly absorbing when seen direct on is almost always quite specular when viewed beyond 45° angle of incidence (see FIG. 9 which shows the TIS measured against the angle of incidence of the white light for two different surfaces in accordance with the invention).

There are multiple factors which effect the density and surface topography of the coating, such as solvent ratio, distance of spray nozzle to surface, type of nozzle, ambient temperature, humidity, temperature of substrate etc. It is thought that the rate at which the solvent evaporates from the coating composition (either in flight or rapidly after it has contacted the surface) is particularly important. The person skilled in the art (such as a spray technician) will be able to adjust these factors in order to prepare a coating of the required density The density of an absorber coating is also related to its THR (where a lower number THR is better), as the optical energy (photons) need space in the coating to enter and be absorbed by the dye. To maximize absorption, as much of the dye as possible must be exposed to the incoming photons.

The amount of light reflected from a surface under normal incidence is proportional to the difference in refractive index of the materials at the interface in accordance with Fresnel's equation shown below. Therefore, the more similar the refractive index of the materials the closer to zero the reflectance will tend. For a particular material, the refractive index will decrease as the density is reduced and so a drop in reflectance will be observed.

$$R = \left| \frac{n1 - n2}{n1 + n2} \right|^2$$

Traditional paint type absorber coatings do not have low enough density to have a very low reflectance (<1.5% THR), but they can be made diffuse (low specular reflectance) by roughening the application surface to scatter the incoming light away from the source. To efficiently trap the photons and hence demonstrate a low THR, the optical space or cavities have to be close to the wavelength range of the photons (For visible spectrum this wavelength range is 300-700 nm), and you need to create peaks and valleys in the coating that also scatter reflected light away from the viewer.

This means that trying to create blacker or less reflective coatings reaches a limit when adding dyes and fillers as these typically increase density and lower porosity, so minimize or eliminate the optical cavities that are used to increase absorption efficiency. This leads to absorption only through light entering the pigment particles confined in the binder resin, which is not an efficient way to trap photons. The current state of the art in paint like absorber coatings typically gives total hemispherical reflectances from 3-5% at finished coating densities greater than 1.3 g/cc.

The present applicant has developed a new method for creating a spray applied super-black absorber coating that produces a uniform, low density absorber coating with a low reflectance from all viewing angles (TIS), and a THR of 1% in the visible spectrum.

This technology enables a relatively low cost absorber coating to be prepared which is relatively damage-proof and whose constituents are of a nonhazardous nature.

There are several parameters which can guide the technician to knowing that the correct result has been achieved. The ideal mass of the coating (if the substrate is practically weighed) should be between 3-15 mg cm$^{-2}$. The volume of paint to achieve this mass is between 0.25 and 0.5 mL cm$^{-2}$ depending on transfer efficiency and overspray. Once sufficient volume has been sprayed the parts are inspected under a bright wide spectrum white light next to a standard sample of known THR values. The level of apparent blackness should be indecipherable from all angles and the level of roughness compared. No pinholes or non-uniformities should be apparent. If the target being sprayed appears less black and smoother, more paint may be applied in order to achieve the target roughness of between 30-50 μm whereby particles are clearly evident on the surface under a bright wide spectrum torch. Where a non-uniform surface is apparent with both grey areas and a rough surface, it suggests that the paint has been applied too wet rendering a smooth underlayer with a rough surface. This result will be difficult to rectify without resulting in and extremely thick rough coating.

The viscosity of the paint formulation is preferably adjusted by modifying the solvent ratio to achieve a viscosity of the freshly prepared paint of between 500-2000 cps.

The ideal solvent ratio can depend on many things such as binder-solvent interactions, pigment particle size and surface area so solvent may be increased or decreased to achieve the correct viscosity to atomise and deliver the paint in the correct way to ensure partial drying of the solution prior to arrival at the substrate.

A further realization is that the reflectivity of the coatings as defined above can be further reduced (for instance below 0.5% in the visible spectrum) by subjecting the coating to a plasma etching step. Thus, the method preferably includes the additional step of:

(iv) plasma etching the coating of step (iii) to selectively remove binder from the coating structure, thereby creating additional optical trapping cavities and allowing more of the absorbing dye to be exposed to incoming photons. The plasma etching step may also reduce the density of the coating.

It is strongly preferred that coatings which have been plasma etched are then coated with a hydrophobic coating, by including the additional step of:

(v) subjecting the coating of step (iv) to a plasma in a reaction chamber in the presence of a coating precursor which includes a fluorocarbon in order to deposit a hydrophobic coating on at least a part of said coating.

A number of preferred embodiments will now be described with reference to the drawings, in which:

FIG. 1 shows SEM images of a spray paint which is sprayed and then etched in accordance with the invention;

FIG. 3 depicts graphs showing the effect of a hydrophobic coating step on the UV-vis reflectance of paints sprayed in accordance with the invention;

FIG. 4 depicts SEMs showing the sprayed paint before and after etching;

Figure 6:
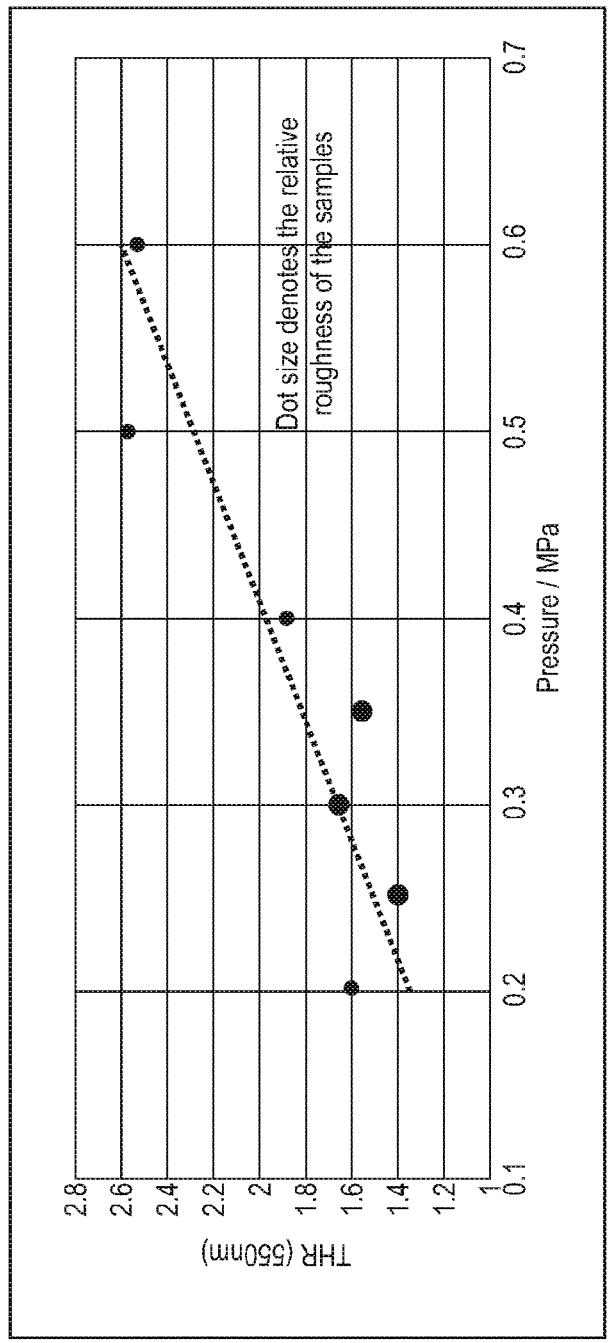
Figure 7:
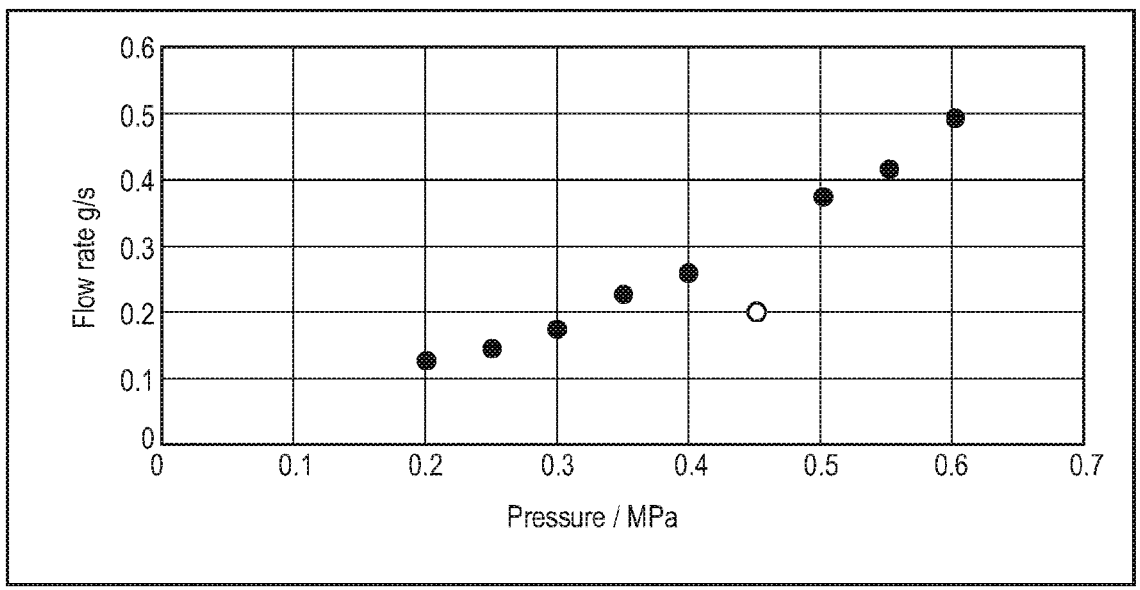
Figure 8:
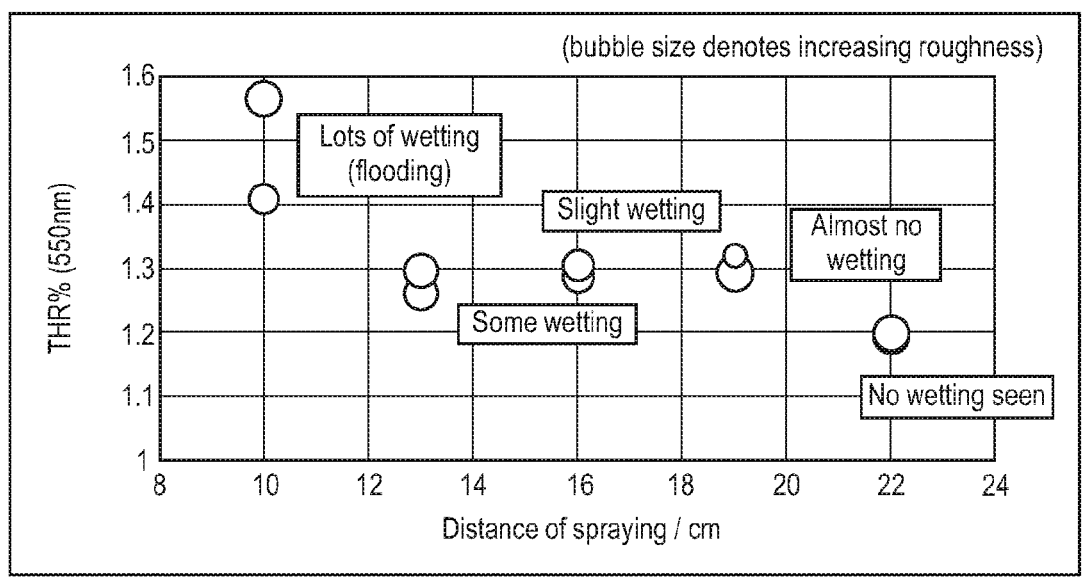
Figure 9:
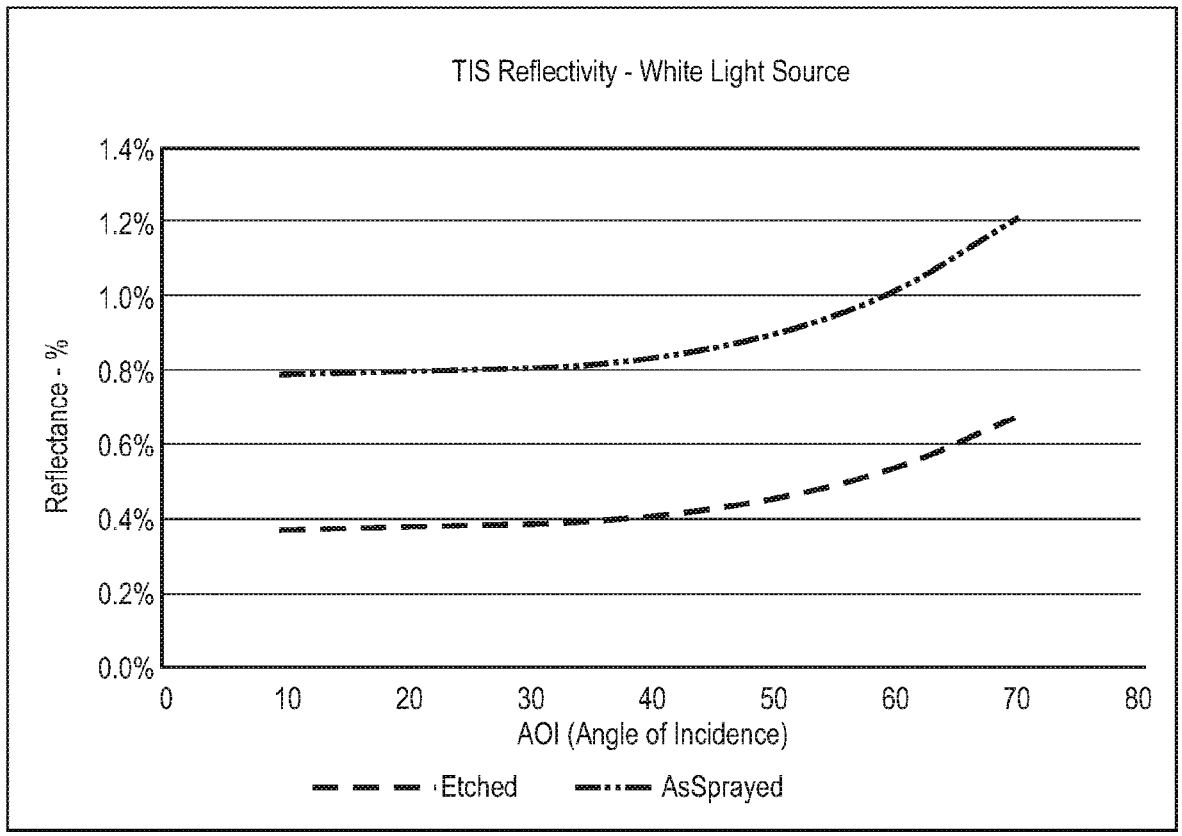

FIG. 6 is a graph showing the relationship between fan pressure and resultant THR. The spot size indicates the degree of roughness. The results based on spraying with Badger® Crescendo airbrush;

FIG. 7 is a graph showing the interdependence of fan pressure and flow rate (g/s) The results based on spraying with Badger® Crescendo airbrush;

FIG. 8 is a graph showing the relationship between nozzle to substrate distance and the THR (based on worked example 15). This is based on a high flow rate Pro-lite® compressed air gun and therefore the spraying distance needs to be higher than with Badger® Crescendo airbrush; and FIG. 9 is a graph of the total integrated scatter measured against the angle of incidence of white light for two different surfaces in accordance with the invention (unetched and etched).

In the Examples below, the designation VBX-1 refers to the coating following etching whereas VBX-2 refers to the un-etched coating.

Measuring Total Hemispherical Reflectance (THR)

We measure Total Hemispherical Reflectance by using a Shimadzu® UV-NIR 2500 Spectrometer fitted with a barium sulphate integrating sphere. The test sample is placed on the measurement port on the integrating sphere and exposed to the illuminating source. A detector collects the reflected energy from the sample coating and plots the performance from 200 nm to 1400 nm. Prior to any measurement being taken the instrument is calibrated against a known reflectance standard.

NON-ETCHED EXAMPLES

Examples 1-10 cover a polyvinyl acetate homopolymer binder with a pigment to binder ratio (PTB) of 60% and ethyl acetate as the solvent. Examples 11-16 cover a binder which is an aqueous copolymer dispersion based on vinyl acetate, vinyl neodecanoate and (meth)acrylic acid esters Vinyl acetate based co-polymer with a PTB of 120% and both EA and Acetone as the solvent.

Example 1

A large batch of premixed emulsion with 4:1 (w/w) ethyl acetate:polyvinylacetate homopolymer was prepared by manual agitation. To 90 g of this, 10.8 g of a water dispersible carbon pigment was added and stirred using a high shear mixer for 17 mins at 10000 rpm giving a pigment to binder ratio of 60%. A water dispersible carbon was chosen to interact well with the water based binder phase. The resulting paint was sprayed using a Badger® 150 syphon fed airbrush at 20 psi pressure and typical atmospheric conditions. 3 beadblasted aluminium coupons were sprayed and gave THR values at 550 nm of 1.001, 0.952, and 1.001% respectively. The masses of the coupons were 0.203, 0.226 and 0.200 g indicating an average mass of 13.1 mg $cm^{-2}$.

Example 2

A large batch of premixed emulsion with 4:1 (w/w) ethyl acetate:polyvinylacetate homopolymer was prepared by manual agitation. To 90 g of this, 10.8 g of a hydrophilic carbon pigment was added and stirred using a wooden spatula giving a pigment to binder ratio of 60%. The resulting paint was sprayed using a Badger® 150 syphon fed airbrush at 20 psi pressure and typical atmospheric conditions. 5 beadblasted aluminium coupons were sprayed and gave THR values at 550 nm of 1.123, 1.235, 1.099, 1.237, 1.236% respectively. The masses of the coupons were 0.355, 0.321, 0.408, 0.255, 0.212 g indicating an average mass of 19.4 mg $cm^{-2}$. The higher mass required to achieve low reflectance in this case was due to the mixing method not achieving efficient dispersion of the pigment powder. Even at much higher masses and roughness the values achieved were usually greater than 1.2% THR.

Example 3

A large batch of premixed emulsion with 4:1 (w/w) ethyl acetate:polyvinylacetate homopolymer was prepared by manual agitation. To 90 g of this, 14.4 g of a hydrophilic carbon pigment was added and stirred using a wooden spatula giving a pigment to binder ratio of 80%. The resulting paint was sprayed using a Badger® 150 syphon fed airbrush at 20 psi pressure and typical atmospheric conditions. 5 beadblasted aluminium coupons were sprayed and gave THR values at 550 nm of 1.196, 1.133, 1.131, 1.064, 1.095% respectively. The masses of the coupons were 0.221, 0.217, 0.193, 0.357, 0.551 g indicating an average mass of 19.2 mg $cm^{-2}$. The increased PTB ratio reduces the reflectance achieved to 1.1% cf. 1.2% at 60% PTB but using this binder the structural integrity of the paint was very poor with a loose powdery texture.

Counter Example 4—Brush Applied

A large batch of premixed emulsion with 4:1 (w/w) ethyl acetate:polyvinylacetate homopolymer was prepared by manual agitation. To 90 g of this, 10.8 g of a hydrophilic carbon pigment was added and stirred using a high shear mixer for 17 mins at 10000 rpm giving a pigment to binder ratio of 60%. The resulting paint was applied by paintbrush in typical atmospheric conditions. A beadblasted aluminium coupon was coated and gave a THR value at 550 nm of 3.009% and a mass of 0.253 g indicating an average mass of 15.8 mg $cm^{-2}$.

Example 5—40 psi Sprayed

A large batch of premixed emulsion with 4:1 (w/w) ethyl acetate:polyvinylacetate homopolymer was prepared by manual agitation. To 90 g of this, 10.8 g of a hydrophilic carbon pigment was added and stirred using a high shear mixer for 17 mins at 10000 rpm giving a pigment to binder ratio of 60%. The resulting paint was sprayed using a Badger® 150 syphon fed airbrush at 40 psi pressure and typical atmospheric conditions. A beadblasted aluminium coupon was coated and gave a THR value at 550 nm of 1.145% and a mass of 0.183 g indicating an average mass of 11.4 mg cm$^{-2}$.

Example 6—40% PTB

A large batch of premixed emulsion with 4:1 (w/w) ethyl acetate:polyvinylacetate homopolymer was prepared by manual agitation. To 90 g of this, 7.2 g of a hydrophilic carbon pigment was added and stirred using a high shear mixer for 17 mins at 10000 rpm giving a pigment to binder ratio of 40%. The resulting paint was sprayed using a Badger® 150 syphon fed airbrush at 20 psi pressure and typical atmospheric conditions. 2 beadblasted aluminium coupons were sprayed and gave THR values at 550 nm of 1.781, 1.787% respectively. The masses of the coatings were 0.181, 0.163 g indicating an average mass of 10.7 mg cm$^{-2}$.

Counter Example 7—20% PTB

A large batch of premixed emulsion with 4:1 (w/w) ethyl acetate:polyvinylacetate homopolymer was prepared by manual agitation. To 90 g of this, 3.6 g of a hydrophilic carbon pigment was added and stirred using a high shear mixer for 17 mins at 10000 rpm giving a pigment to binder ratio of 20%. The resulting paint was sprayed using a Badger® 150 syphon fed airbrush at 20 psi pressure and typical atmospheric conditions. 2 beadblasted aluminium coupons were sprayed and gave THR values at 550 nm of 3.586, 3.588% respectively. The masses of the coatings were 0.152, 0.145 g indicating an average mass of 9.28 mg cm$^{-2}$.

Example 8—Hydrophobic Pigment

A large batch of premixed emulsion with 4:1 (w/w) ethyl acetate:polyvinylacetate homopolymer was prepared by manual agitation. To 90 g of this, 9 g of a solvent dispersible carbon pigment was added and stirred using a high shear mixer for 17 mins at 10000 rpm giving a pigment to binder ratio of 50%. The resulting paint was sprayed using a Badger® 150 syphon fed airbrush at 20 psi pressure and typical atmospheric conditions. 4 beadblasted aluminium coupons were sprayed and gave THR values at 550 nm of 0.991, 0.947, 0.987, and 0.942% respectively. The masses of the coatings were 0.187, 0.209, 0.201, 0.212 g indicating an average mass of 12.6 mg cm$^{-2}$. The improved dispersability in the solvent phase of the hydrophobic pigment was assumed to improve blackness and stability of the formulation resulting in lower reflectance. However, due to the increased dispersion of the pigment, the PTB could not be increased above 50% at this solvent ratio because the viscosity of the paint became too high to spray. So the effect of increasing the solvent ratio and PTB was assessed.

Example 9—Hydrophobic Pigment with Higher Solvent Ratio

A large batch of premixed emulsion with 7:1 (w/w) ethyl acetate:polyvinylacetate homopolymer was prepared by manual agitation. To 90 g of this, 9 g of a hydrophobic carbon pigment was added and stirred using a high shear mixer for 17 mins at 10000 rpm giving a pigment to binder ratio of 80%. The resulting paint was sprayed using a Badger® 150 syphon fed airbrush at 20 psi pressure and typical atmospheric conditions. 5 beadblasted aluminium coupons were sprayed at different distances and gave THR values at 550 nm of 1.156, 1.16, 0.692, 0.679, 0.827% respectively. The masses of the coatings were 0.196, 0.22, 0.208, 0.207, and 0.216 g indicating an average mass of 13.0 mg cm$^{-2}$. The distance of spraying was varied in this case to assess the effect of spray distance and the results can be seen in FIG. 2A. At 20 cm distance the reflectance could be as low as 0.7% however the structural integrity of the coating was very poor. Between 10 and 15 cm from the substrate allowed to achieve the 1% THR value without resulting in a powdering flaky coating. The roughness, Ra, values of the 5 coupons were 34.4, 32.8, 90.5, 91.2, 55.1 μm respectively.

Example 10—Hydrophobic Pigment with Different Solvent Ratios 3 large batches of premixed emulsions with 7:1, 8:1 and 9:1 (w/w) ethyl acetate:polyvinylacetate homopolymer were prepared by manual agitation. To 90 g of these, 9, 8 and 7.2 g of a hydrophobic carbon pigment were added and stirred using a high shear mixer for 17 mins at 10000 rpm giving a pigment to binder ratio of 80% in each case. The resulting paint was sprayed using a Badger® 150 syphon fed airbrush at 20 psi pressure, 15 cm distance and typical atmospheric conditions. 3 beadblasted aluminium coupons were sprayed at the same distance and gave THR values at 550 nm of 0.916, 0.952, 1.039% respectively. The masses of the coatings were 0.192, 0.20, and 0.182 g indicating an average mass of 11.9 mg cm$^{-2}$. The distance of spraying was kept constant to highlight the effect of increased solvent which is shown to increase the % THR gradually. The results are shown in FIG. 2C Example 11—Vinyl Acetate Based Co-Polymer Polymer Binder, 14:1 Solvent Ratio, 80% PTB A large batch of premixed emulsion with 14:1 (w/w) ethyl acetate:Vinyl acetate based co-polymer copolymer was prepared by manual agitation. The thixotropic nature of the binder resulted in very fast thickening of the solution which necessitated higher solvent ratios. To 90 g of this, 4.8 g of a hydrophobic carbon pigment was added and stirred using a high shear mixer for 10 mins at 10000 rpm giving a pigment to binder ratio of 80%. The resulting paint was sprayed using a Badger® 150 syphon fed airbrush at 20 psi pressure and typical atmospheric conditions. 2 beadblasted aluminium coupons were sprayed and gave THR values at 550 nm of 1.562 and 1.525% respectively. The masses of the coupons were 0.053, 0.0524 g indicating an average mass of 3.3 mg cm$^{-2}$. Although the mass of the coating was low in this case, the coverage was very good. However the coating was markedly smoother with Ra values of 20.1 and 18 μm.

Example 12—Vinyl Acetate Based Co-Polymer Polymer Binder, 14:1 Solvent Ratio, 80% PTB—Predispersed Due to the thixotropic nature of the binder in this case, pre-dispersion of the pigment in the solvent was carried out. 4.8 g of a hydrophobic carbon pigment was added to 84 g of ethyl acetate and stirred using a high shear mixer for 10 mins at 10000 rpm. To this, 6 g of binder was added the mixture stirred for a further 2 minutes giving a pigment to binder ratio of 80%. To 90 g of this, 4.8 g of a hydrophobic carbon pigment was added and stirred using a high shear mixer for 10 mins at 10000 rpm giving a pigment to binder ratio of 80%. The resulting paint was sprayed using a Badger® 150 syphon fed airbrush at 20 psi pressure and typical atmospheric conditions. 2 beadblasted aluminium coupons were sprayed and gave THR values at 550 nm of 1.322, 1.315% respectively. The masses of the coupons were 0.061, 0.0574 g indicating an average mass of 3.7 mg cm$^{-2}$. A small improvement could be seen for pre-dispersing the pigment in this case so it was carried forward with this binder system.

Example 13—Vinyl Acetate Based Co-Polymer Polymer Binder, 14:1 Solvent Ratio, 100% PTB Pre-dispersion of the pigment in the solvent was carried out by adding 6 g of a hydrophobic carbon pigment to 84 g of ethyl acetate and stirred using a high shear mixer for 10 mins at 10000 rpm. To this, 6 g of binder was added the mixture stirred for a further 2 minutes giving a pigment to binder ratio of 100%. The resulting paint was sprayed using a Badger® 150 syphon fed airbrush at 20 psi pressure and typical atmospheric conditions. 2 beadblasted aluminium coupons were sprayed and gave THR values at 550 nm of 0.996, and 1.014% respectively. The masses of the coupons were 0.0643, and 0.0705 g indicating an average mass of 4.2 mg cm$^{-2}$. The coverage rate and overall roughness are significantly lower with this binder; however, a higher loading of carbon and solvent is required.

Example 14—Vinyl Acetate Based Co-Polymer Polymer Binder, 14:1 Solvent Ratio, 100% PTB—Large Batch Large Gun For faster coverage rates a Devilbliss Pro-lite® spray gun was required to be used and this necessitated some changes to the formulation to achieve equivalent drying to the small airbrush system. A larger batch of paint also had to be formulated. Pre-dispersion of the pigment in the solvent was carried out. 37 g of a hydrophobic carbon pigment was added to 363 g of ethyl acetate and stirred using a high shear mixer for 10 mins at 10000 rpm. To this, 37 g of binder was added the mixture stirred for a further 2 minutes giving a pigment to binder ratio of 100%. The resulting paint was sprayed using a Devilbliss Prolite gravity fed gun with 1.2 mm nozzle and TE10 aircap at 30 psi pressure and typical atmospheric conditions. 1 beadblasted aluminium coupons was sprayed and gave a THR value at 550 nm of 1.96%. The mass of the coupon was 0.093 g indicating an average mass of 5.8 mg cm$^{-2}$. Although the mass was high for this binder the roughness was very low and the sample appeared grey. It was suspected that the solvent was not evaporating as efficiently with this gun as with the airbrush.

Example 15—Vinyl Acetate Based Co-Polymer Polymer Binder, 10:1 Solvent Ratio, 120% PTB—Acetone as the Solvent Pre-dispersion of the pigment in the solvent was carried out. 45 g of a hydrophobic carbon pigment was added to 363 g of acetone and stirred using a high shear mixer for 10 mins at 10000 rpm. To this, 37 g of binder was added the mixture stirred for a further 2 minutes giving a pigment to binder ratio of 120% and 10:1 solvent ratio. Using acetone resulted in a much lower viscosity with this binder and also facilitates evaporation. The resulting paint was sprayed using a Devilbliss Prolite gravity fed gun with 1.2 mm nozzle and TE10 aircap at 30 psi pressure and 16 cm distance and typical atmospheric conditions. 1 beadblasted aluminium coupons was sprayed and gave a THR value at 550 nm of 1.29%. The mass of the coupon was 0.087 g indicating an average mass of 5.4 mg cm$^{-2}$.

Figure 5:
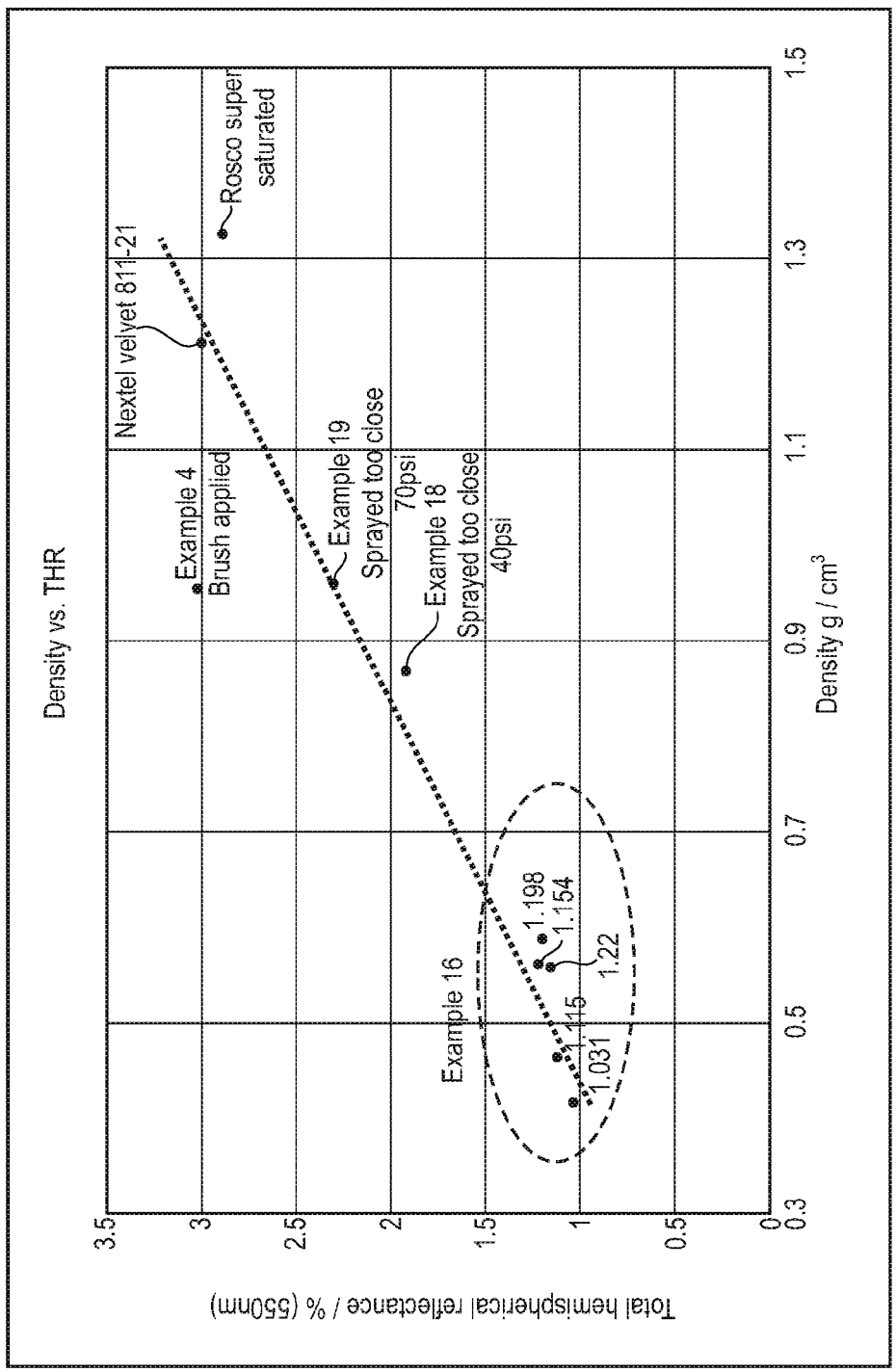
FIG. 5 is a graph showing the link between coating density and reflectance.

Example 16—Vinyl Acetate Based Co-Polymer Polymer Binder, 8:1 Solvent Ratio, 120% PTB—Acetone as the Solvent Pre-dispersion of the pigment in the solvent was carried out. 45 g of a hydrophobic carbon pigment was added slowly over 3 mins to 296 g of acetone and stirred using a high shear mixer for a further 2 mins at 5000 rpm. To this, 37 g of binder was added the mixture stirred for a further 2 minutes at 7000 rpm giving a pigment to binder ratio of 120% and 8:1 solvent ratio. Using acetone resulted in a much lower viscosity with this binder and also facilitates evaporation. The resulting paint was sprayed using a Devilbliss Prolite gravity fed gun with 1.2 mm nozzle and TE10 aircap at 30 psi pressure at a distance of approximately 20 cm and typical atmospheric conditions. 1 beadblasted aluminium coupon was sprayed and gave a THR value at 550 nm of 1.031%. The mass of the coupon was 0.093 g indicating an average mass of 5.8 mg cm$^{-2}$. The density of this coating was calculated by measuring the average thickness of the coating using a Bruker Dektak® profilometer to be 332 μm and calculating the volume occupied. The density was found to be 0.420 g cm$^{-3}$. FIG. 5 demonstrates this value in comparison with some other coupons sprayed using the same formulation. All coupons with % R at or below 1.2% demonstrated measured densities below 0.6 g cm$^{-3}$ whereas examples 18 and 19 which were sprayed too close to the substrate are shown on the graph to demonstrate far higher densities and hence THR values.

Example 17—Vinyl Acetate Based Co-Polymer Polymer Binder, 8:1 Solvent Ratio, 130% PTB—Acetone as the Solvent Pre-dispersion of the pigment in the solvent was carried out. 48 g of a hydrophobic carbon pigment was added slowly over 3 mins to 296 g of acetone and stirred using a high shear mixer for a further 2 mins at 5000 rpm. To this, 37 g of binder was added the mixture stirred for a further 2 minutes at 7000 rpm giving a pigment to binder ratio of 130% and 8:1 solvent ratio. Using acetone resulted in a much lower viscosity with this binder and also facilitates evaporation. The resulting paint was sprayed using a Devilbliss Prolite gravity fed gun with 1.2 mm nozzle and TE10 aircap at 30 psi pressure at a distance of approximately 20 cm and typical atmospheric conditions. 1 beadblasted aluminium coupon was sprayed and gave a THR value at 550 nm of 0.994%. The mass of the coupon was 0.107 g indicating an average mass of 6.6 mg cm$^{-2}$.

Counter Example 18—Vinyl Acetate Based Co-Polymer Polymer Binder, 8:1 Solvent Ratio, 120% PTB—Acetone as the Solvent—Sprayed too Close at 40 psi Pre-dispersion of the pigment in the solvent was carried out. 54 g of a hydrophobic carbon pigment was added slowly over 3 mins to 355 g of acetone and stirred using a high shear mixer for a further 2 mins at 5000 rpm. To this, 44 g of binder was added the mixture stirred for a further 2 minutes at 7000 rpm giving a pigment to binder ratio of 120% and 8:1 solvent ratio. The resulting paint was sprayed using Badger® 150 syphon fed airbrush at 40 psi pressure and typical atmospheric conditions 1 beadblasted aluminium coupon was sprayed and gave a THR value at 550 nm of 1.919%. The mass of the coupon was 0.171 g and its density was calculated as 0.865 g cm$^{-3}$.

Counter Example 19—Vinyl Acetate Based Co-Polymer Polymer Binder, 8:1 Solvent Ratio, 120% PTB—Acetone as the Solvent—Sprayed too Close at 70 psi Pre-dispersion of the pigment in the solvent was carried out. 54 g of a hydrophobic carbon pigment was added slowly over 3 mins to 355 g of acetone and stirred using a high shear mixer for a further 2 mins at 5000 rpm. To this, 44 g of binder was added the mixture stirred for a further 2 minutes at 7000 rpm giving a pigment to binder ratio of 120% and 8:1 solvent ratio. The resulting paint was sprayed using Badger® 150 syphon fed airbrush at 70 psi pressure and typical atmospheric conditions 1 beadblasted aluminium coupon was sprayed and gave a THR value at 550 nm of 2.297%. The mass of the coupon was 0.0616 g and its density was calculated as 0.955 g cm$^{-3}$ Example 20—Vinyl Acetate Based Co-Polymer Polymer Binder, 8:1 Solvent Ratio, 120% PTB—Acetone as the Solvent Pre-dispersion of the pigment in the solvent was carried out. 54 g of a hydrophobic carbon pigment was added slowly over 3 mins to 355 g of acetone and stirred using a high shear mixer for a further 2 mins at 5000 rpm. To this, 44 g of binder was added the mixture stirred for a further 2 minutes at 7000 rpm giving a pigment to binder ratio of 120% and 8:1 solvent ratio. The resulting paint was sprayed using Badger® 150 syphon fed airbrush at 30 psi pressure and typical atmospheric conditions 1 beadblasted aluminium coupon was sprayed and gave a THR value at 550 nm of 1.031%. The mass of the coupon was 0.0862 g and its density was calculated as 0.414 g cm$^{-3}$.

Etched Examples

Example 21

Paint Preparation

To prepare a 0.5 L batch, 62 g of carbon pigment is pre-dispersed in 355 g of acetone by slowly adding the powder over 3 mins. The mixture is stirred using a square hole high shear mixing head on a Silverson® L5M instrument for a total of 5 mins at 5000 rpm and cooled with a water bath to minimise heat build-up in and evaporation of the solvent. 44 g of binder (high pigment capacity vinyl acetate co-polymer) medium is weighed out and slowly added to the pigment/solvent and stirred for a further 2 mins at 7000 rpm or until a uniform dispersion is achieved as evidenced by placing a drop of the mixture on a glass slide and observing any non-uniformities. The ratio of solvent to binder is 8:1 to achieve a thin enough mixture to paint by spray and the pigment to binder mass ratio is 140%. Care needs to be taken to avoid heating the mixture.

Paint Application

The paint is applied using a compressed air fed spray gun at a pressure between 0.2-0.4 MPa. The gun should be held between 10 and 30 cm from the substrate to limit wetting of the paint with excess solvent and drips/streaks forming. If the gun is held too close a solid paint like black coating will form as excess solvent will allow it to flow and combine into a solid film. This would have a reflectance over 5%. To achieve 1% reflectance the surface must be textured and avoid full film formation and therefore the fluid flow rate of the paint should be minimised to achieve good atomisation and low surface wetting. The roughness of the coating will build up with thickness to an ideal roughness average ($R_a$) between 30-50 um.

Paint Etching

An O2 etch is used to increase the blackness of the coating by creating additional pores and cavities on the order of hundreds of nanometres. To selectively etch the coating to create small pores rather than remove layers of material, low power and a high flow/pressure of O2 is required to limit the effect of etch by-products on etch selectivity. The chamber is pumped down to between $10^{-1}$ and $10^{-2}$ torr using a rotary vane pump or similar. Standard conditions are 0.1 W cm$^{-2}$ with between 100 and 300 sccm $O_2$, P=1-2 Torr, room temperature. The mass of material removed by etching is roughly 3% of the total coating mass. The reflectance decreases from roughly 1-1.3% at 550 nm to less than 0.5%.

Hydrophobic Coating

Following $O_2$ etching the surface is rendered hydrophilic. In order to reverse this a hydrophobic coating must be applied. This is carried out using a 0.4 W cm$^{-2}$ CF4—C2H4 plasma in a ratio of 10:1 for 15 s. Lower power or higher concentration of C2H4 results in a thick grey polymer being deposited whereas higher power results in a CF4 etch process which increases the red/blue ratio of the coating.

Example 22

Paint Preparation

To prepare a 0.5 L batch, 43 g of carbon pigment is pre-dispersed in 373 g of Ethyl acetate by slowly adding the powder over 3 mins. The mixture is stirred using an square hole high shear mixing head on a Silverson® L5M instrument for a total of 5 mins at 5000 rpm and cooled with a water bath to minimise heat build-up in and evaporation of the solvent. 27 g of binder (high pigment capacity vinyl acetate co-polymer) medium is weighed out and slowly added to the pigment/solvent and stirred for a further 2 mins at 7000 rpm or until a uniform dispersion is achieved as evidenced by placing a drop of the mixture on a glass slide and observing any non-uniformities. The ratio of solvent to binder is 14:1 to achieve a thin enough mixture to paint by spray and the pigment to binder mass ratio is 160%. Care needs to be taken to avoid heating the mixture.

Paint Application

The paint is applied using a compressed air fed spray gun at a pressure between 0.2-0.4 MPa. The gun should be held between 10 and 30 cm from the substrate to limit wetting of the paint with excess solvent and drips/streaks forming. If the gun is held too close a solid paint like black coating will form as excess solvent will allow it to flow and combine into a solid film. This would have a reflectance over 5%. To achieve 1% reflectance the surface must be textured and avoid full film formation and therefore the fluid flow rate of the paint should be minimised to achieve good atomisation and low surface wetting. The roughness of the coating will build up with thickness to an ideal roughness average ($R_a$) between 30-50 μm.

Paint Etching

An $O_2$ etch is used to increase the blackness of the coating by creating pores and cavities on the order of hundreds of nanometres. To selectively etch the coating to create small pores rather than remove layers of material, low power and a high flow/pressure of $O_2$ is required to limit the effect of etch by-products on etch selectivity. The chamber is pumped down to between $10^{-1}$ and $10^{-2}$ Torr using a rotary vane pump or similar. Standard conditions are 0.1 W cm$^{-2}$ with between 100 and 300 sccm O2, P=1-2 Torr, room temperature. The mass of material removed by etching is roughly 3% of the total coating mass. The reflectance decreases from roughly 1-1.3% at 550 nm to less than 0.5%. The use of pulsed power improves the selectivity (absorbance increase/mass removed) of the etch by reducing build-up of reactive species within the chamber. Pulsing is carried out oscillating between on and off condition of the source at a frequency of between 1 and 10 kHz with a duty cycle of 50%.

Hydrophobic Coating

Following O2 etching the surface is rendered hydrophilic. In order to reverse this a hydrophobic coating must be applied. This is carried out using a 0.6 W cm$^{-2}$ CF4—C2H4 plasma in a ratio of 10:1 for 20 s. Lower power or higher concentration of C2H4 results in a thick grey polymer being deposited whereas higher power results in a CF4 etch process which increases the red/blue ratio of the coating.

Example 23

Paint Preparation

For more viscous binder media (polyvinyl acetate homopolymer), the pigment can be directly added to a thinned binder solution. To prepare a 0.5 L batch, 100 g of binder was added to 400 g Ethyl acetate. These are combined by simply shaking until a homogeneous milky white solution is obtained. To this 80 g of carbon pigment is added by slowly adding the powder over 3 mins. The mixture is continually stirred using a square hole high shear mixing head on a Silverson® L5M instrument for a total of 5 mins at 5000 rpm and cooled with a water bath to minimize heat build-up in and evaporation of the solvent. The mixture is stirred until a uniform dispersion is achieved as evidenced by placing a drop of the mixture on a glass slide and observing any non-uniformities. The ratio of solvent to binder is 4:1 to achieve a thin enough mixture to paint by spray and the pigment to binder mass ratio is 80%. Care needs to be taken to avoid heating the mixture.

Paint Application

The paint is applied using a compressed air fed spray gun at a pressure between 0.2-0.4 MPa. The gun should be held between 10 and 30 cm from the substrate to limit wetting of the paint with excess solvent and drips/streaks forming. If the gun is held too close a solid paint like black coating will form as excess solvent will allow it to flow and combine into a solid film. This would have a reflectance over 5%. To achieve 1% reflectance the surface must be textured and avoid full film formation and therefore the fluid flow rate of the paint should be minimised to achieve good atomisation and low surface wetting. The roughness of the coating will build up with thickness to an ideal roughness average ($R_a$) between 30-50 μm.

Paint Etching

An O2 etch is used to increase the blackness of the coating by creating additional pores and cavities on the order of hundreds of nanometres. To selectively etch the coating to create small pores rather than remove layers of material, low power and a high flow/pressure of O2 is required to limit the effect of etch by-products on etch selectivity. The chamber is pumped down to between $10^{-1}$ and $10^{-2}$ torr using a rotary vane pump or similar. Standard conditions are 0.1 W cm$^{-2}$ with between 100 and 300 sccm $O_2$, P=1-2 Torr, room temperature. The mass of material removed by etching is roughly 3% of the total coating mass. The reflectance decreases from roughly 1-1.3% at 550 nm to less than 0.5%.

Hydrophobic Coating

Following $O_2$ etching the surface is rendered hydrophilic. In order to reverse this a hydrophobic coating must be applied. This is carried out using a 0.4 W cm$^{-2}$ CF4—C2H4 plasma in a ratio of 10:1 for 15 s. Lower power or higher concentration of C2H4 results in a thick grey polymer being deposited whereas higher power results in a CF4 etch process which increases the red/blue ratio of the coating.

Example 24

Paint Preparation

For more viscous binder media (polyvinyl acetate homopolymer), the pigment can was directly added to a thinned binder solution. To prepare a 0.5 L batch, 50 g of binder was added to 400 g Ethyl acetate. These are combined by simply shaking until a homogeneous milky white solution is obtained. To this 40 g of carbon pigment is added by slowly adding the powder over 3 mins. The mixture is continually stirred using a square hole high shear mixing head on a Silverson® L5M instrument for a total of 5 mins at 5000 rpm and cooled with a water bath to minimise heat build-up in and evaporation of the solvent. The mixture is stirred until a uniform dispersion is achieved as evidenced by placing a drop of the mixture on a glass slide and observing any non-uniformities. The ratio of solvent to binder is 8:1 to achieve a thin enough mixture to paint by spray and the pigment to binder mass ratio is 80%. Care needs to be taken to avoid heating the mixture.

Paint Application

The paint is applied using a compressed air fed spray gun at a pressure between 0.2-0.4 MPa. The gun should be held between 10 and 30 cm from the substrate to limit wetting of the paint with excess solvent and drips/streaks forming. If the gun is held too close a solid paint like black coating will form as excess solvent will allow it to flow and combine into a solid film. This would have a reflectance over 5%. To achieve 1% reflectance the surface must be textured and avoid full film formation and therefore the fluid flow rate of the paint should be minimised to achieve good atomisation and low surface wetting. The roughness of the coating will build up with thickness to an ideal roughness average (Ra) between 30-50 um.

Paint Etching

An O2 etch is used to increase the blackness of the coating by creating additional pores and cavities on the order of hundreds of nanometres. To selectively etch the coating to create small pores rather than remove layers of material, low power and a high flow/pressure of O2 is required to limit the effect of etch by-products on etch selectivity. The chamber is pumped down to between 10-1 and 10-2 torr using a rotary vane pump or similar. Standard conditions are 0.1 W $cm^{-2}$ with between 100 and 300 sccm O2, P=1-2 Torr, room temperature. The mass of material removed by etching is roughly 3% of the total coating mass. The reflectance decreases from roughly 1-1.3% at 550 nm to less than 0.5%.

Hydrophobic Coating

Following O2 etching the surface is rendered hydrophilic. In order to reverse this a hydrophobic coating must be applied. This is carried out using a 0.4 W $cm^{-2}$ CF4—C2H4 plasma in a ratio of 10:1 for 15 s. Lower power or higher concentration of C2H4 results in a thick grey polymer being deposited whereas higher power results in a CF4 etch process which increases the red/blue ratio of the coating.

Further Experimental Results

Figure 2A:
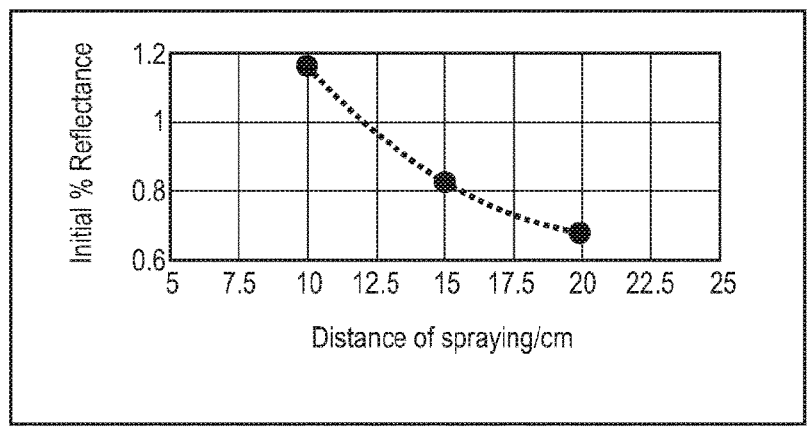
FIG. 2A-2C depict graphs showing how properties of the paint used in the invention behaves under certain conditions.
Figure 2B:
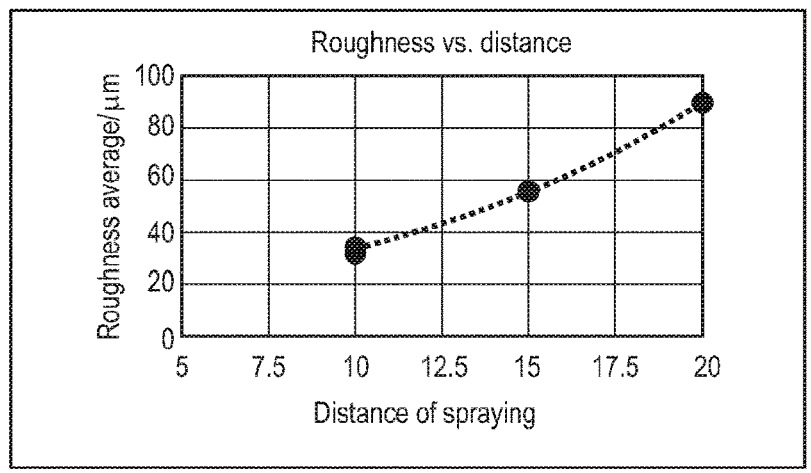
Figure 2C:
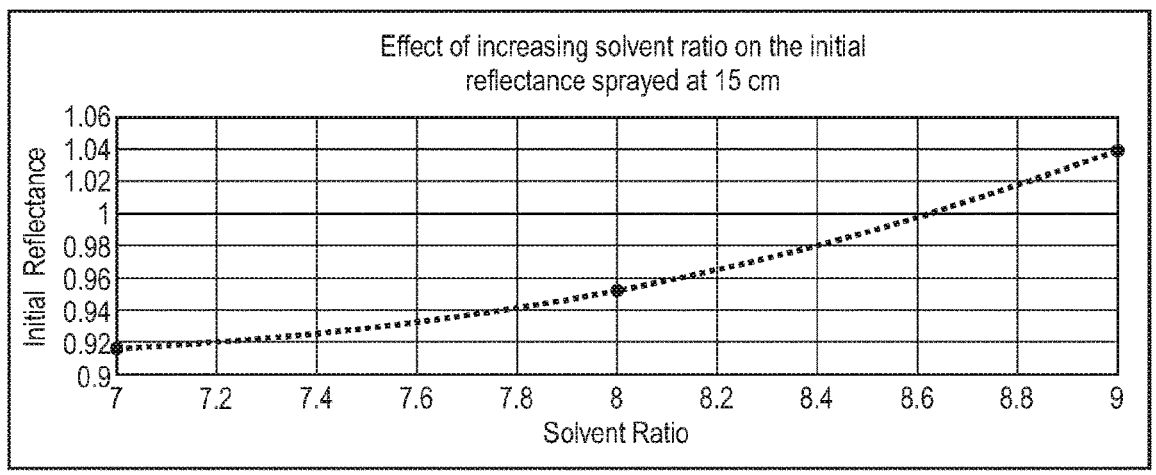

FIGS. 2A, 2B and 2C cover data collected from Example 24—8:1 solvent:binder (homopolymer) 80% PTB.

The formulation was desired to be spray applied to allow for a rough optical structure to be created as opposed to a brush applied paint which will flatten as it dries. For the purpose of spraying, the formulation must include a volatile solvent to aid aerosol formation. The solvent should be volatile enough that it does not build up in the applied paint structure sufficiently to densify and flatten the coating like a normal paint. The pigment therefore must be dispersible and stable in a solvent medium as well as be compatible with the binder medium.

Particulate Size/Type vs Reflectance

It is well known that a small particle size for pigments ensures good absorption of light and therefore a higher tinting strength. Carbon black is well known as an effective pigment due to its small size down to a primary particle size of 5 nm. The high surface area/volume ratio of small pigment particles is what allows for efficient light trapping. Due to the small particles however, carbon black undergoes Van der Waals interactions resulting in agglomerates being formed of at least 80-800 nm in range. For hygiene and safety reasons, carbon is often further compacted to reduce dust formation and may be sold as pellets or beads. In this study carbons with as-supplied size ranges of 37-149 μm, and 50-100 nm were compared. High shear mixing was used to disperse the pigments which will reduce their size but to what final size is not evident yet. It was found that large mesh carbon paints only improved in the NIR range and did not really improve in the visible range significantly by etching. Graphene nano-platelets were also compared (as additives—due to cost) as these are also in the 5-50 nm size range. However, no obvious benefit could be observed from their inclusion.

The large improvement in visible light absorption with VBX-1 is thought to originate from removal of the binder matrix to create cavities in the 100-700 nm range as evidenced by SEM analysis. For the most effective etch, the binder matrix is selectively removed thereby exposing a greater surface area of the pigment particles as well as opening up cavities in the structure. The large several hundred nanometre cavities created by removing the binder allow for effective light penetration and trapping. From the SEM images of FIG. 1, there appears to be large numbers of particles in the 20-100 nm range but as part of larger agglomerates.

Binder

A vinyl acetate (VA) based binder appears to work better at stabilising the carbon pigment than an acrylic based binder. VA binders demonstrate excellent properties in terms of spreadability, good wet tack strength, good adhesion, excellent wet and dry tensile strength, durability to washing and dry cleaning, salt stability, and heat sealability and therefore are used extensively in a range of coating technologies. The acrylic based binders tested have far higher water content and that is likely to be the cause of destabilisation of the carbon. Manufacturers now quite often make bi-functional or co-functional binders with perhaps one vinyl acetate group and one (meth)acrylic acid group which allows both higher pigment loadings and a broader range of different pigment types.

The preferred binders are polyvinyl acetate and LDM2454 (vinyl acetate, vinyl neodecanoate, and (meth) acrylic acid esters).

Interaction between pigment particles and binder functionality is largely attributed to very weak intermolecular forces such as hydrogen bonding and dipole interactions. The competition between pigment binder interactions and pigment solvent interactions will therefore affect the stability of the colloidal particles and also needs to be considered. Ethyl acetate was chosen as a preferred solvent to ensure a similarity between the solvent and the binder for initially good solvation of the binder and so that a balance of interaction could be expected between the pigment and the solvent. Acetone has also proved effective as a solvent whereas ethanol has not produced a stable colloid. This suggests that a relevant interaction between the pigments currently used (Emperor 2000 and 1600) is via the carbonyl (=O) group present in both the solvent and the binder.

Coating Properties

It is believed that the structure of the coating is that of a metamaterial i.e. a synthetic composite material with a structure such that it exhibits properties not usually found in natural materials. By this, we mean that the structure and porosity of the coating greatly influence reflectivity. To achieve the preferred structure and porosity the main issue with spray method is controlling the evaporation of the solvent and the drying of the binder/pigment phase. The formulation of the paint is also critical with a very high pigment loading of >100% pigment/binder (dependent on binder pigment loading capacity) mass ratio preferred to result in significant exposure of carbon at the surface. The solvent choice and ratio will affect viscosity and drying and therefore can be varied to account for other changes such as ambient temperature or gun condition.

If the paint is too wet on hitting the surface of the part being coated it will tend to spread and smooth resulting in a reflectance closer to 2% than 1% (@550 nm). The maximum improvement after etching will be close to a fixed percentage (up to 80%) of the starting value therefore a starting value of 2% will be reduced to a minimum of 0.4% whereas a 1% coating could theoretically achieve 0.2%. For etched paint with a reflectance <0.5% a range of starting values can however be used.

If the mixture hits the surface too dry then there will not be sufficient energy to form a cohesive film resulting in very poor integrity of the coating. To achieve this condition, the preferred air pressure (affecting fluid flow rate), distance, temperature, humidity and viscosity must be maintained.

The effect of the distance of spraying can be seen in FIGS. 2A and 2B.

The effect of increasing solvent ratio on the reflectance can be seen in FIG. 2C. As the solvent ratio is increased above an ideal, the reflectance increases. If an excess of solvent is used, there will be excessive wetting of the substrate being painted. This results in a smoothing and densification of the coating resulting in higher reflectance.

Etch Chemistry

An O2 or O2/N2 plasma can be used to effectively etch the paint creating optical cavities. So far, any attempt to use CF4 containing plasmas has been too aggressive resulting in very high mass loss at very short times. An Argon etch has been non-selective and only produces grey coatings. We define etch selectivity as $\Delta R/\Delta m$ with R as reflectance and m as mass in mg. A very selective etch with low mass loss will initially only create small cavities capable of absorbing the shorter wavelengths and so the etch must be continued up to a point where an acceptable R/B ratio close to 1 is achieved. This is on the order of minutes (3-4) and can be carried out either with a continuous wave plasma or pulsed plasma. The area of the part being etched must also be considered as the breakdown of the binder produces acetic acid as a degradation product in the chamber which is likely to alter the etch rate by consuming active oxygen species. By using a high flow of O2 and a high pressure, a sufficient supply of reactive oxygen can be supplied to etch uniformly a plate the full size of the chamber (400×400 mm).

Hydrophobic Coating Step

Due to the roughness of the paint and the large cavities it is preferred to employ a hydrophobic coating to ensure penetration into all the gaps. For this, a power of 0.4 W cm$^{-2}$ was used with a CF4—C2H4 plasma in a ratio of 10:1 for 15 s. At lower power (0.2 and 0.3 W cm$^{-2}$) the coating appears to be initially hydrophobic but degrades over time. The uniformity in the chamber is also not good at this power with significantly heavier degradation at the edges and corners of the electrodes. Using 0.4 W cm$^{-2}$, at lower HC content, the CF4 will heavily etch the coating and result in degradation in the performance, most notably an increase in the red/blue ratio. This can be seen in the right hand figure of FIG. 3. To limit the CF4 etch rate, the HC ratio is increased and the power limited.

The red/blue ratio is defined as the ratio of percentage reflectance at two different wavelengths, namely 650 nm (red) and 475 nm (blue). This is apparent in the redness of the sample where the black is more of a brown colour under strong light.

By increasing the power to 0.4 W cm$^{-2}$ and maintaining a CF4: C2H4 ratio of at least 8:1, an effective and stable hydrophobic coating can be deposited in very short times with minimal effect on the reflectance values. The samples are still observed to degrade marginally under the dew test conditions with the most notable effect being some pinholes appearing near the edges of the coupons. The coatings overall are still hydrophobic to liquid water after this dew test however which indicates that the coating is still stable and in place.

The micrographs presented in FIG. 4 show the microstructure of the coating before (VBX-2—top image) and after (VBX-1—bottom image) etching. It is clear from these two images that no significant difference in the large features(>10 μm) is evident after etching but at higher resolution (FIG. 1) it is evident that the binder is being selectively removed resulting in more exposed pigment surfaces.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in UK patent application number 1716503.6, from which this application claims priority, and in the abstract accompanying this application are incorporated herein by reference.

The invention claimed is:

1. A method of coating a substrate, including the steps of:
   (i) providing a suspension of a carbon black-based pigment and a binder in a solvent, wherein the ratio of pigment to binder is greater than 40 wt % and the pigment is uniformly dispersed in the solvent;
   (ii) spray-coating the suspension onto the substrate with the majority of the solvent evaporating during the spray coating step to result in a porous coating of pigment and binder on the substrate; and
   (iii) continuing step (ii) until the coating thickness is at least 30 micrometres;
   wherein the pigment does not include any carbon nanotubes,
      wherein the binder is polyvinyl acetate or a mixture of vinyl acetate, vinyl neodecanoate and (meth) acrylic acid esters or any binder containing a component of vinyl acetate functionality, or the binder is acrylic based, and
      wherein the coating of pigment and binder on the substrate has a density of up to 0.75 gcm$^{-3}$ so as to result in pores or cavities which act as optical traps to suppress light reflectance.

2. The method as claimed in claim 1, wherein the flow rate of suspension coated onto the substrate in step (ii) is from 0.05 g/s to 2 g/s.

3. The method as claimed in claim 1, wherein the solvent is acetone.

4. The method as claimed in claim 1, wherein the ratio of solvent to binder in the suspension of step (i) is from 2:1 to 14:1.

5. The method as claimed in claim 4, wherein the ratio of solvent to binder is from 8:1 to 14:1.

6. The method as claimed in claim 1, in which the evaporation of solvent in step (ii) is controlled such that the resulting coating has cavities which range in size from 100 nm to 700 nm.

7. The method as claimed in claim 1, wherein the pigment is particulate in form.

8. The method as claimed in claim 7, wherein the average size of the pigment particles is from 50 nm to 10 um.

9. The method as claimed in claim 1, wherein the weight ratio of pigment to binder in step (i) is greater than 120%.

10. The method as claimed in claim 1, wherein the solvent has a boiling point less than 120° C.

11. The method as claimed in claim 1, including the additional step of: (iv) plasma etching the coating of step (iii) to selectively remove binder from the coating structure, thereby creating additional optical trapping cavities and allowing more of the pigment to be exposed to incoming photons.

12. The method as claimed in claim 11, wherein the plasma etching takes place at a power density from $0.05 Wcm^{-2}$ to $0.3 Wcm^{-2}$.

13. The method as claimed in claim 12, wherein the power density is about $0.1 Wcm^{-2}$.

14. The method as claimed in claim 11, wherein the plasma etching takes place for a time from 60 to 1200 seconds.

15. The method as claimed in claim 11, wherein the plasma etching takes place at a pressure from 0.1 to 2 Torr.

16. The method as claimed in claim 11, wherein step (iv) takes place in the presence of oxygen, a mixture of $O_2$ and $N_2$, or a mixture of $O_2$ and He.

17. The method as claimed in claim 11, including the additional step of: (v) subjecting the coating of step (iv) to a plasma in a reaction chamber in the presence of a coating precursor which includes a fluorocarbon in order to deposit a hydrophobic coating on at least a part of said coating.

18. The method as claimed in claim 17 wherein the coating precursor is a mixture of $CF_4$ and $C_2H_4$.

19. The method as claimed in claim 18, wherein the ratio of $CF_4$ to $C_2H_4$ is from 3:1 to 20:1.

20. The method as claimed in claim 17, wherein step (v) takes place at a power density from $0.2 Wcm^{-2}$ to $0.8 Wcm^{-2}$.

21. The method as claimed in claim 17, wherein step (v) takes place for a time from 10 to 600 seconds.

22. The method as claimed in claim 17, wherein step (v) takes place at a pressure from 0.1 to 2 Torr.

23. The method as claimed in claim 1 wherein the viscosity of the suspension of step (i) is from 500 to 2000 cps.

24. The method as claimed in claim 1, wherein the binder is polyvinyl acetate or a mixture of vinyl acetate, vinyl neodecanoate and (meth) acrylic acid esters or any binder containing a component of vinyl acetate functionality.

* * * * *